United States Patent [19]

Takaoka et al.

[11] Patent Number: 5,759,948
[45] Date of Patent: Jun. 2, 1998

[54] TITANIUM OXIDE FOR PHOTOCATALYST AND METHOD OF PRODUCING THE SAME

[75] Inventors: Yoichi Takaoka; Yoshio Hirobe; Masanori Tomonari; Yoshiki Kinoshita, all of Kusatsu, Japan

[73] Assignee: Ishihara Sangyo Kaisha Ltd., Osaka, Japan

[21] Appl. No.: 384,653

[22] Filed: Feb. 6, 1995

[30] Foreign Application Priority Data

Feb. 7, 1994 [JP] Japan .................... 6-035459
Mar. 18, 1994 [JP] Japan .................... 6-074225

[51] Int. Cl.⁶ .................................................. B01J 23/74
[52] U.S. Cl. ........................ 502/325; 502/338; 502/349; 502/350
[58] Field of Search .................... 502/325, 338, 502/349, 350

[56] References Cited

U.S. PATENT DOCUMENTS

| | | | |
|---|---|---|---|
| 4,012,338 | 3/1977 | Urwin | 502/350 |
| 4,061,596 | 12/1977 | Matsushita et al. | 252/463 |
| 4,187,282 | 2/1980 | Matsuda et al. | 423/244 |
| 4,422,958 | 12/1983 | Dupin | 502/217 |
| 4,485,189 | 11/1984 | Dupin | 502/217 |
| 4,532,119 | 7/1985 | Dupin | 423/230 |
| 4,994,247 | 2/1991 | Tooley et al. | 423/247 |

FOREIGN PATENT DOCUMENTS

| | | | |
|---|---|---|---|
| 64810/94 | 1/1995 | Australia | C09J 11/04 |
| 0060741 | 9/1982 | European Pat. Off. | |
| 0376216 | 7/1990 | European Pat. Off. | |
| 0401884 | 12/1990 | European Pat. Off. | |
| 0506428 | 9/1992 | European Pat. Off. | |
| 0514177 | 11/1992 | European Pat. Off. | |
| 0633064 | 1/1995 | European Pat. Off. | |
| 2301299 | 9/1976 | France | |
| 60-187322 | 9/1985 | Japan | |
| 61-76160 | 4/1986 | Japan | |
| 1-232966 | 9/1989 | Japan | |
| 1232966 | 9/1989 | Japan | |
| 3-233100 | 10/1991 | Japan | |
| 4-78326B | 10/1992 | Japan | |
| 6-39285 | 2/1994 | Japan | |
| 6-279026 | 10/1994 | Japan | |
| 1488767 | 12/1977 | United Kingdom | |

OTHER PUBLICATIONS

Australian Office Action dated Dec. 11, 1997, issued in counterpart foreign application.

Japanese Official Action dated Dec. 31, 1996, issued in a counterpart foreign application (English translation attached).

Chen, L. and Chou, T., "Photodecolorization of Methyl Orange Using Silver Ion Modified $TiO_2$ as Photocatalyst", *Industrial and Engineering Chemistry Research* 33:1436–1443 (1994).

Taiwanese Official Action dated Dec. 31, 1996, issued in counterpart foreign application (English translation attached).

*Primary Examiner*—Thurman K. Page
*Assistant Examiner*—Kathryne E. Shelborne
*Attorney, Agent, or Firm*—Cushman Darby and Cushman, IP group of Pillsbury, Madison & Sutro LLP

[57] ABSTRACT

The invention provides a titanium oxide photocatalyst having an excellent photocatalytic property and comprising titanium oxide particles which have part or the whole of an iron compound contained therein and supported thereon. The invention further provides a titanium oxide photocatalyst comprising titanium oxide particles which are treated with a mineral acid and which have part or the whole of an iron compound contained therein and supported thereon. The invention still further provides a process for producing the titanium oxide photocatalyst. Utilizing the excellent photocatalytic property, materials which exert or may exert a harmful influence upon human bodies or living environment, such as organic halogen compounds, malodorous gases, oils, bacteria, fungi and algae can be rapidly and effectively removed.

20 Claims, No Drawings

5,759,948

TITANIUM OXIDE FOR PHOTOCATALYST AND METHOD OF PRODUCING THE SAME

BACKGROUND OF THE INVENTION

The present invention relates to a titanium oxide having excellent photocatalytic properties and a method of producing the titanium oxide.

When titanium oxide is irradiated with a light having an energy higher than the band gap thereof, electrons are produced in the conduction band and holes are produced in the valence band due to the photo-excitation. The strong reducing power of the electrons produced by the photo-excitation and the strong oxidizing power of the holes produced by the photo-excitation are utilized for photocatalytic reactions such as decomposition and purification of noxious materials, deodorizing of malodorous gases, for example, ammonia, aldehydes and amines, decomposition of water, and killing of bacteria, actinomycetes, fungi and algae. For example, JP 2-9850B discloses to decompose and purify injurious materials in wastes using photocatalysts such as titanium oxides. Furthermore, JP 4-78326B discloses to remove the smell of sewage in toilet facilities, the pet smell, the tobacco smell, the cooking smell, the body smell and the like with photocatalysts such as titanium oxides. In addition, JP 4-29393B discloses to kill cells by applying to the cells a given voltage generated in photocatalysts such as titanium oxide by irradiation with the light while allowing the cells to contact with the photocatalysts.

The titanium oxide used for the photocatalytic reaction is desired to have the higher photocatalytic property in order to shorten the time of the photocatalytic reaction or miniaturize the apparatus used for the photocatalytic reaction. As such titanium oxide, the above JP 2-9850B describes titanium oxides which support metals such as platinum and rhodium or metal oxides such as nickel oxide and ruthenium oxide. However, platinum, rhodium, ruthenium oxide, etc. supported on the surface of titanium oxide are expensive and the production cost increases considerably. Moreover, the metals supported are apt to dissolve out during photocatalytic reaction. JP 4-78326B proposes mixed oxides of titanium oxide with iron titanate, iron oxide and the like, but their photocatalytic property is still not satisfactory.

The inventors have conducted research in an attempt to obtain inexpensive titanium oxide photocatalysts having an excellent photocatalytic property and found that (1) when an iron compound is contained in titanium oxide particles and/or supported on the surface of titanium oxide particles, the photocatalytic properties of the titanium oxide particles are improved as compared with when titanium oxide is used alone or in admixture with an iron compound, (2) when titanium oxide is treated with a mineral acid, the photocatalytic property is improved, and (3) when an iron compound is contained in titanium oxide particles treated with a mineral acid and/or supported on the surface of the titanium oxide particles treated with a mineral acid, the photocatalytic property is further improved. As a result, the present invention has been accomplished.

SUMMARY OF THE INVENTION

The object of the present invention is to provide a titanium oxide photocatalyst having excellent photocatalytic properties.

Another object of the present invention is to provide a method of producing the titanium oxide photocatalyst.

The present invention concerns with a titanium oxide photocatalyst containing an iron compound. The titanium oxide photocatalyst of the present invention comprises titanium oxide particles which maintain the state of an iron compound being incorporated therein and/or the state of an iron compound being supported on the surface thereof.

DESCRIPTION OF THE INVENTION

The titanium oxides herein used include various titanium oxides such as anatase type titanium oxide, rutile type titanium oxide, amorphous titanium oxide, metatitanic acid and orthotitanic acid, titanium hydroxide, hydrous titanium oxide and hydrated titanium oxide.

The average particle size of the titanium oxides can be obtained by calculation using the Scherrer's formula or by observation with an electron microscope. In the present invention, it is preferably 1–500 nm, more preferably 5–250 nm, most preferably 5–50 nm.

The iron compounds include iron oxide, iron hydroxide and iron oxyhydroxide and in addition, iron salts such as iron sulfate, iron chloride, iron nitrate, iron carbonate, iron acetate and iron ions thereof. In the present invention, compounds of trivalent and/or divalent iron are generally used and are preferred for improving the photocatalytic property of the titanium oxides. Preferred examples are iron oxides ($Fe_2O_3$, $Fe_3O_4$), iron hydroxides ($Fe(OH)_2$, $Fe(OH)_3$) and iron oxyhydroxide (FeOOH). Amount of the iron compound can be optionally varied depending on the desired photocatalytic reaction, but is usually 0.0005–10% by weight, preferably 0.001–5% by weight, more preferably 0.001–3% by weight, most preferably 0.001–1% by weight (in terms of Fe) based on the weight of $TiO_2$ of the titanium oxide particles. If the amount of the iron compound is smaller or larger than the above range, the photocatalytic property tends to deteriorate.

The iron compound contained in the titanium oxide photocatalyst is preferably in the state of being supported on the surface of the titanium oxide particles. In this case, amount of the iron compound supported is usually 0.05–5000 µg, preferably 0.1–3000 µg, more preferably 0.1–2000 µg, most preferably 0.3–1000 µg (in terms of Fe) per square meter of the surface area of the titanium oxide particles. If the amount of the iron compound is smaller or larger than the above range, the photocatalytic property tends to deteriorate.

It is not clear why the photocatalytic property can be markedly improved when the iron compound is contained inside the titanium oxide particles and/or supported on the surface of the titanium oxide particles, but it can be presumed that the electrons produced by the photo-excitation of titanium oxide readily transfer to the iron compound and, therefore, charge separation from the holes becomes easy, and as a result, amounts of the holes and electrons which participate in the photocatalytic reaction increase. For this reason, it is considered that trivalent iron compounds to which the electrons readily transfer are preferred as the iron compounds and furthermore, it is preferred that the iron compounds are present on the surface of the titanium oxide particles. It can be supposed that the trivalent iron compounds are converted to divalent state upon receiving the electrons produced by the photo-excitation of titanium oxide, but return to the trivalent state by the Fenton's reaction of iron atoms and can again receive the electrons.

The titanium oxide photocatalyst of the present invention which supports the iron compound on the surface can be obtained by various processes. For example, mention may be made of ① a process which comprises hydrolyzing or neutralizing a titanium compound such as titanyl sulfate, titanium sulfate, titanium chloride or an organotitanium compound in the presence of an iron compound and, if necessary, in the presence of a seed, ② a process which comprises immersing titanium oxide particles or a support on which the titanium oxide particles are supported in a solution of the iron compound, and ③ a process which comprises adding the iron compound to a suspension of titanium oxide particles or a liquid containing a support on which the titanium oxide particles are supported and hydrolyzing or neutralizing the iron compound. These processes give the titanium oxide photocatalysts having excellent characteristics and these are preferred.

The above process ① can also be carried out in the following manner: That is, titanyl sulfate, titanium sulfate or titanium chloride previously containing the iron compound is hydrolyzed or neutralized and a monobasic acid such as nitric acid or hydrochloric acid is added to the resulting titanium oxide to carry out peptization or the titanium oxide is further subjected to hydrothermal treatment under application of pressure, thereby to obtain a titanium oxide containing the iron compound. As the titanyl sulfate, titanium sulfate or titanium chloride previously containing the iron compound, there may be used those which are obtained by digesting titanium ores containing the iron compound. The hydrolysis of the titanium compound is preferably carried out at lower than the boiling point of an aqueous solution of the titanium compound. As the iron compounds used in the above processes ①, ② and ③, preferred are water-soluble iron compounds such as sulfates, chlorides and nitrates of iron. As the alkalis used for the neutralization, mention may be made of various alkalis such as sodium hydroxide, potassium hydroxide, ammonium carbonate, ammonia and amines.

The titanium oxide particles used in the above processes ② and ③ can be prepared by various known processes. Examples of these processes are (i) a process which comprises hydrolyzing a titanium compound such as titanyl sulfate, titanium sulfate, titanium chloride or an organotitanium compound, if necessary, in the presence of a seed, (ii) a process which comprises adding an alkali to a titanium compound such as titanyl sulfate, titanium sulfate, titanium chloride or an organotitanium compound, if necessary, in the presence of a seed, thereby to neutralize the titanium compound, (iii) a process of vapor phase oxidation of titanium chloride, an organotitanium compound or the like, and (iv) a process of firing the titanium oxide obtained in the above processes (i), (ii) and (iii) or subjecting a suspension of the titanium oxide to hydrothermal treatment, if necessary, with addition of an acid or an alkali. The titanium oxide obtained by the processes (i) and (ii) and the titanium oxide obtained by the hydrothermal treatment in the process (iv) are preferred because use of them results in titanium oxide photocatalyst having an excellent photocatalytic property. The hydrolysis of titanium compound in the above process (i) is preferably carried out at lower than the boiling point of an aqueous solution of the titanium compound.

The product obtained by the above processes can be used as the titanium oxide photocatalyst containing iron compound of the present invention, but, if necessary, the product may be subjected to fractionation, washing and drying or firing. The fractionation can be carried out by customary methods such as filtration and decantation. The drying can be carried out at an optional temperature, but a temperature of 100°–200° C. is suitable. The firing temperature is suitably 200°14 500° C. By effecting the firing, the iron compound is diffused in the titanium oxide particles and is readily incorporated into the particles. In the process of the present invention, there are no special limitations in the conditions such as concentrations and addition rates of the iron compound, titanium compound, alkali, etc., hydrolyzing and neutralizing temperatures, and concentration of the titanium oxide in the dispersion, and they can be set optionally. Furthermore, a dispersant such as orthophosphoric acid, pyrophosphoric acid or hexametaphosphoric acid or an alkali salt thereof, sodium orthosilicate or sodium metasilicate can be added to the above-mentioned dispersion of titanium oxide in such an amount as giving no adverse effect on the photocatalytic property. In some cases, the photocatalytic property can be improved by the addition of the dispersant.

The present invention further relates to a titanium oxide photocatalyst obtained by treating titanium oxides with a mineral acid. In the present invention, the titanium oxides includes various titanium oxides such as anatase type titanium oxide, rutile type titanium oxide, amorphous titanium oxide, metatitanic acid and orthotitanic acid, titanium hydroxide, hydrous titanium oxide and hydrated titanium oxide. In the present invention, the anatase type titanium oxide is preferred because of its excellent photocatalytic property. The average particle size of aggregates of the titanium oxide is preferably 1–1000 nm, more preferably 5–500 nm and most preferably 5–300 nm. The titanium oxide can be prepared by various processes. These processes include, for example, the above-mentioned processes (i), (ii), (iii) and (iv). When the titanium oxide obtained by the processes (i) and (ii) and the titanium oxide obtained by the hydrothermal treatment in the process (iv) are used, titanium oxide photocatalysts having excellent photocatalytic properties are obtained and these processes are preferred. The hydrolysis of titanium compound in the above process (i) is preferably carried out at not higher than the boiling point of an aqueous solution of the titanium compound. The resulting titanium oxide may be fractionated from the solution, washed or dried, if necessary.

As for the treatment of titanium oxide with a mineral acid, first the titanium oxide is allowed to contact with the mineral acid, for example, by adding the mineral acid to a dispersion of the titanium oxide. Then, the titanium oxide allowed to contact with the mineral acid is fractionated and, if necessary, may be washed and dried or fired. The fractionation can be effected by customary methods such as filtration and decantation. The drying is carried out at an optional temperature, but a temperature of 100°–200° C. is suitable. The firing temperature is suitably 200°–500° C. As examples of the mineral acid, mention may be made of sulfuric acid, hydrochloric acid, nitric acid and hydrofluoric acid. These mineral acids can be used each alone or in combination of two or more. Hydrofluoric acid is preferred in the present invention. Concentration of the mineral acid used for treatment is preferably 0.0005–20N, more preferably 0.001–10N and most preferably 0.1–2N. If the concentration is lower than 0.0005N, the desired effect can hardly be obtained and if it is higher than 20N, dissolution of titanium oxide proceeds too much. The temperature for the treatment with a mineral acid can be optionally set, but is usually 0°–100° C., preferably room temperature to 80° C., more preferably room temperature to 60° C. The treating time can be optionally set, but is usually 0.1–48 hours, preferably 0.5–12 hours, more preferably 0.5–5 hours. In this way, the titanium oxide photocatalyst of the present invention treated with mineral acids can be obtained.

The present invention further relates to a titanium oxide photocatalyst comprising titanium oxide particles which are treated with a mineral acid and which have an iron compound contained therein and/or an iron compound supported on the surface. As the iron compound, there may be used the iron compounds, referred to hereabove, namely, iron oxide, iron hydroxide and iron oxyhydroxide and in addition, iron salts such as iron sulfate, iron chloride, iron nitrate, iron carbonate and iron acetate and iron ions thereof. In the present invention, compounds of trivalent and/or divalent iron, i.e., ferric compound and/or ferrous compound are generally used and these are preferred for improving the photocatalytic property of the titanium oxide. Preferred examples are iron oxides ($Fe_2O_3$, $Fe_3O_4$), iron hydroxides ($Fe(OH)_2$, $Fe(OH)_3$) and iron oxyhydroxide (FeOOH). Content of the iron compound can be optionally varied depending on the desired photocatalytic reaction, but is usually 0.0005–10% by weight, preferably 0.001–5% by weight, more preferably 0.001–3% by weight, most preferably 0.001–1% by weight (in terms of Fe) based on the weight of $TiO_2$ of the titanium oxide. If the content of the iron compound is smaller or larger than the above range, the photocatalytic property tends to deteriorate. The iron compound contained in the titanium oxide photocatalyst is preferably in the state of being supported on the surface of the titanium oxide particles. In this case, the amount of the iron compound supported is usually 0.05–5000 µg, preferably 0.1–3000 µg, more preferably 0.1–2000 µg, most preferably 0.3–1000 µg (in terms of Fe) per 1 $m^2$ of the surface area of the titanium oxide particles. If the amount of the iron compound is smaller or larger than the above range, the photocatalytic property tends to deteriorate.

For obtaining the titanium oxide photocatalyst which supports the iron compound on the surface, there may be employed, for example, the following processes: (a) a process which comprises adding the iron compound to a liquid containing titanium oxide subjected to the mineral acid treatment or a liquid in which the titanium oxide subjected to the mineral acid treatment or a support having the titanium oxide subjected to the mineral acid treatment is suspended, (b) a process which comprises subjecting to neutralization, hydrolysis or oxidation the iron compound after added to the liquid in the above process (a), (c) a process which comprises immersing the titanium oxide subjected to the mineral acid treatment or a support having the titanium oxide subjected to the mineral acid treatment in a solution of the iron compound, and (d) a process which comprises subjecting to neutralization, hydrolysis or oxidation the iron compound after carrying out the immersion in the above process (c). As the iron compounds used in the above processes (a), (b), (c) and (d), preferred are water-soluble iron compounds such as sulfates, chlorides and nitrates of iron. As the alkalis used for the neutralization, mention may be made of various alkalis such as sodium hydroxide, potassium hydroxide, ammonium carbonate, ammonia and amines. The thus obtained product can be used as the titanium oxide photocatalyst of the present invention containing iron compound, but if necessary, the product may be subjected to fractionation, washing, drying or firing. The fractionation can be carried out by the conventional methods such as filtration and decantation. The drying can be carried out at optional temperatures, but a temperature of 100°–200° C. is suitable. The firing temperature is suitably 200°–500° C. By this firing, the iron compound is diffused and is readily incorporated into the titanium oxide particles. In this way, the titanium oxide photocatalyst of the present invention comprising titanium oxide particles which are subjected to the mineral acid treatment and which have the iron compound contained therein and/or the iron compound supported on the surface can be obtained.

In order to use the titanium oxide photocatalyst of the present invention for various photocatalytic reactions such as synthesis reaction of organic substances and decomposition reaction of noxious materials, the titanium oxide photocatalyst is irradiated with a light having an energy higher than its band gap in the presence of the materials to be treated. The titanium oxide photocatalyst of the present invention can also be used in the state of being suspended in a solvent or supported or coated on a support or in the state of a powder, a ground powder or a molded powder depending on the use. The materials which are removed by decomposition or oxidation thereof by the photocatalytic reaction of titanium oxide are those which exert or may exert a harmful influence on human bodies or living environment. Examples are biological oxygen demanding materials, environmental pollutants such as air pollutants, various agricultural chemicals such as herbicides, fungicides, insecticides and nematicides, and microbes such as bacteria, actinomycetes, fungi, algae and molds. The environmental pollutants include organic compounds such as organic halogen compounds, organic phosphorus compounds and other organic compounds and inorganic compounds such as nitrogen compounds, sulfur compounds, cyanogen compounds and chromium compounds. Examples of the organic halogen compounds are polychlorobiphenyl, Freon, trihalomethane, trichloroethylene, and tetrachloroethylene. Examples of organic materials other than the organic halogen compounds and organic phosphorus compounds are hydrocarbons such as surface-active agents and oils, aldehydes, mercaptans, alcohols, amines, amino acids and proteins. Examples of the nitrogen compounds are ammonia and nitrogen oxides. The light having an energy higher than the band gap is preferably a light containing ultraviolet ray. Examples of the light are sunlight and those of fluorescent lamp, black light, halogen lamp, xenon flash lamp and mercury lamp. Especially preferred is a light containing near ultraviolet ray of 300–400 nm. Irradiation intensity and time can be optionally set depending on the amount of the materials to be treated.

EXAMPLE 1

One liter of an aqueous titanyl sulfate solution of 80 g/l in concentration was heated to 85° C. and kept at that temperature for 3 hours to hydrolyze titanyl sulfate. The resultant hydrolyzate was filtered and washed and then suspended in water to obtain a suspension of 50 g/l in terms of $TiO_2$. Then, an aqueous nitric acid solution was added to the suspension to adjust the pH of the suspension to 1.0. Thereafter, the suspension was charged in an autoclave and subjected to hydrothermal treatment at 180° C. for 13 hours under saturated vapor pressure. Then, the resulting product was filtered, washed and dried to obtain titanium oxide (Sample 1). Sample 1 had a specific surface area of 80.4 $m^2/g$, an anatase type crystal form and an average particle size of 17.0 nm calculated with the Scherrer's formula.

10 g of the titanium oxide of Sample 1 was immersed in an acidic aqueous solution containing 1.45 mg of iron chloride ($FeCl_3 \cdot 6H_2O$) dissolved therein, followed by evaporation to dryness. The resulting dried product was ground and suspended in water to obtain a suspension of 100 g/l in terms of $TiO_2$. Then, aqueous ammonia was added to the suspension to adjust the pH to 7.0, followed by filtration, washing and drying to obtain a titanium oxide photocatalyst of the present invention which contained an iron compound (Sample A). This Sample A contained iron hydroxide in an amount of 0.0029% by weight (in terms of Fe) based on the weight of $TiO_2$ of the titanium oxide. Amount of iron hydroxide supported per square meter of the titanium oxide particles was 0.36 µg in terms of Fe.

EXAMPLE 2

The procedure of Example 1 was repeated, except that an acidic aqueous solution containing 4.83 mg of iron chloride ($FeCl_3.6H_2O$) dissolved therein was used, thereby obtaining a titanium oxide photocatalyst of the present invention which contained an iron compound (Sample B). This Sample B contained iron hydroxide in an amount of 0.010% by weight (in terms of Fe) based on the weight of $TiO_2$ of the titanium oxide. Amount of iron hydroxide supported per square meter of the titanium oxide particles was 1.2 µg in terms of Fe.

EXAMPLE 3

The procedure of Example 1 was repeated, except that an acidic aqueous solution containing 8.70 mg of iron chloride ($FeCl_3.6H_2O$) dissolved therein was used, to thereby obtain a titanium oxide photocatalyst of the present invention which contained an iron compound (Sample C). This Sample C contained iron hydroxide in an amount of 0.018% by weight (in terms of Fe) based on the weight of $TiO_2$ of the titanium oxide. Amount of iron hydroxide supported per square meter of the titanium oxide particles was 2.2 µg in terms of Fe.

EXAMPLE 4

The procedure of Example 1 was repeated, except that an acidic aqueous solution containing 145 mg of iron chloride ($FeCl_3.6H_2O$) dissolved therein was used, thereby to obtain a titanium oxide photocatalyst of the present invention which contained an iron compound (Sample D). This Sample D contained iron hydroxide in an amount of 0.30% by weight (in terms of Fe) based on the weight of $TiO_2$ of the titanium oxide. Amount of iron hydroxide supported per square meter of the titanium oxide particles was 37 µg in terms of Fe.

Comparative Example 1

The titanium oxide of Sample 1 obtained in Example 1 was used as Comparative Sample E. This Sample 1 contained 0.0001% by weight (in terms of Fe) of the iron compound based on the weight of $TiO_2$ of the titanium oxide.

EXAMPLE 5

The procedure of Example 1 was repeated, except that titanium oxide obtained by firing the titanium oxide of Sample 1 at 500° C. for 2 hours (Sample 2) was used in place of Sample 1 and an acidic aqueous solution containing 14.5 mg of iron chloride ($FeCl_3.6H_2O$) dissolved therein was used, thereby to obtain a titanium oxide photocatalyst of the present invention which contained an iron compound (Sample F). This Sample F contained iron hydroxide in an amount of 0.029% by weight (in terms of Fe) based on the weight of $TiO_2$ of the titanium oxide. Amount of iron hydroxide supported per square meter of the titanium oxide particles was 5.9 µg in terms of Fe.

The titanium oxide of Sample 2 had a specific surface area of 49.4 $m^2/g$, an anatase type crystal form and an average particle size of 18.2 nm calculated with the Scherrer's formula.

EXAMPLE 6

10 g of the titanium oxide of Sample 2 used in Example 5 was suspended in water to obtain a suspension of 100 g/l in terms of $TiO_2$. Then, to the suspension was added under stirring an acidic aqueous solution containing 14.5 mg of iron chloride ($FeCl_3.6H_2O$) dissolved therein, and thereafter, aqueous ammonia was added thereto to adjust the pH to 7.0, followed by filtration, washing and drying to obtain a titanium oxide photocatalyst of the present invention which contained an iron compound (Sample G). This Sample G contained iron hydroxide in an amount of 0.029% by weight (in terms of Fe) based on the weight of $TiO_2$ of the titanium oxide. Amount of the iron hydroxide supported per square meter of the titanium oxide particles was 5.9 µg in terms of Fe.

EXAMPLE 7

Sample G obtained in Example 6 was fired at 300° C. for 1 hour to obtain a titanium oxide photocatalyst of the present invention which contained an iron compound (Sample H). This Sample H contained iron hydroxide in an amount of 0.029% by weight (in terms of Fe) based on the weight of $TiO_2$ of the titanium oxide.

EXAMPLE 8

10 g of the titanium oxide of Sample 2 used in Example 5 was immersed in an acidic aqueous solution containing 14.5 mg of iron chloride ($FeCl_3.6H_2O$) dissolved therein, followed by filtration, washing and drying to obtain a titanium oxide photocatalyst of the present invention which contained an iron compound (Sample I). This Sample I contained the iron compound in an amount of 0.029% by weight (in terms of Fe) based on the weight of $TiO_2$ of the titanium oxide. Amount of the iron compound supported per square meter of the titanium oxide particles was 5.9 µg in terms of Fe.

Comparative Example 2

The titanium oxide of Sample 2 obtained in Example 5 was used as Comparative Sample J. This Sample 2 contained 0.0001% by weight (in terms of Fe) of the iron compound based on the weight of $TiO_2$ of the titanium oxide.

EXAMPLE 9

The procedure of Example 1 was repeated, except that the titanium oxide of the following Sample 3 was used in place of Sample 1 and an acidic aqueous solution containing 14.5 mg of iron chloride ($FeCl_3.6H_2O$) dissolved therein was used, thereby to obtain a titanium oxide photocatalyst of the present invention which contained an iron compound (Sample K). This Sample K contained iron hydroxide in an amount of 0.029% by weight (in terms of Fe) based on the weight of $TiO_2$ of the titanium oxide. Amount of the iron hydroxide supported per square meter of the titanium oxide particles was 1.6 µg in terms of Fe.

The Sample 3 was prepared in the following manner. 4 mol/l of aqueous ammonia was added to 1 liter of an aqueous titanium tetrachloride solution of 80 g/l in concentration with stirring to adjust the pH to 7.0 and neutralize the titanium tetrachloride at room temperature. The resultant neutralization product was filtered and washed and then suspended in water to obtain a suspension of 50 g/l in terms of $TiO_2$. Then, an aqueous nitric acid solution was added to the suspension to adjust the pH of the suspension to 1.0, and thereto was added titanium trichloride in an amount of 0.1 in molar ratio to $TiO_2$. Thereafter, the suspension was heated at 100° C. for 4 hours under reflux and under bubbling with nitrogen gas. Then, the resulting product was filtered, washed and dried to obtain a titanium oxide (Sample 3). The Sample 3 had a specific surface area of 176.6 $m^2/g$, an anatase type crystal form and an average particle size of 7.4 nm calculated with the Scherrer's formula.

Comparative Example 3

The titanium oxide of Sample 3 obtained in Example 9 was used as Comparative Sample L. This Sample 3 contained 0.0001% by weight (in terms of Fe) of the iron compound based on the weight of $TiO_2$ of the titanium oxide.

EXAMPLE 10

To 1 liter of an aqueous titanyl sulfate solution of 80 g/l in concentration was added an acidic aqueous solution containing 12.1 mg of iron sulfate ($FeSO_4 \cdot 7H_2O$) dissolved therein and then, the solution was heated to 85° C. and kept at that temperature for 3 hours to hydrolyze the titanyl sulfate. The resultant hydrolyzate was filtered, washed and dried to obtain a titanium oxide photocatalyst of the present invention which contained an iron compound (Sample M). This Sample M contained iron hydroxide in an amount of 0.0060% by weight (in terms of Fe) based on the weight of $TiO_2$ of the titanium oxide, had a specific surface area of 297.0 $m^2/g$, had an anatase type crystal form, and had an average particle size of 7.0 nm calculated with the Scherrer's formula.

The photocatalytic property of the samples (A–M) obtained in the above Examples and Comparative Examples was evaluated in the following manner. 0.1 g of each sample was dispersed in ion-exchange water to obtain a suspension of 4 g/l in terms of $TiO_2$. To 25 ml of the suspension was added 25 µl of 2-propanol, followed by irradiation with a black light for 2 hours to effect the photocatalytic reaction of 2-propanol. The intensity of light was 2 $mW/cm^2$. The irradiated surface area was 28 $cm^2$. Change of the concentration of 2-propanol during the reaction was measured. From the measurements was calculated a first-order rate constant of decomposition (k). The results are shown in Table 1. As can be seen from Table 1, the titanium oxides containing iron compound of the present invention are superior in photocatalytic activity.

TABLE 1

| | Sample | First-order rate constant of decomposition k (hour$^{-1}$) |
|---|---|---|
| Example 1 | A | 0.31 |
| Example 2 | B | 0.42 |
| Example 3 | C | 0.42 |
| Example 4 | D | 0.24 |
| Comparative Example 1 | E | 0.10 |
| Example 5 | F | 0.38 |
| Example 6 | G | 0.38 |
| Example 7 | H | 0.21 |
| Example 8 | I | 0.34 |
| Comparative Example 2 | J | 0.14 |
| Example 9 | K | 0.38 |
| Comparative Example 3 | L | 0.10 |
| Example 10 | M | 0.43 |

EXAMPLE 11

The procedure of Example 6 was repeated, except that a titanium oxide of the following Sample 4 was used in place of Sample 2 and an acidic aqueous solution containing 145 mg of iron chloride ($FeCl_3 \cdot 6H_2O$) dissolved therein was used, thereby obtaining a titanium oxide photocatalyst of the present invention which contained an iron compound (Sample N). This Sample N contained iron hydroxide in an amount of 0.29% by weight (in terms of Fe) based on the weight of $TiO_2$ of the titanium oxide. Amount of the iron hydroxide supported per square meter of the titanium oxide particles was 48 µg in terms of Fe.

The Sample 4 was prepared in the following manner. One liter of an aqueous titanyl sulfate solution of 80 g/l in concentration was heated to 85° C. and kept at that temperature for 3 hours to hydrolyze the titanyl sulfate. The resultant hydrolyzate was filtered and washed and then suspended in water to obtain a suspension of 50 g/l in terms of $TiO_2$. Then, an aqueous nitric acid solution was added to the suspension to adjust the pH of the suspension to 1.0 and thereafter, sodium hydroxide was added thereto to adjust the pH to 7.0, followed by filtration and washing. To the resulting titanium oxide wet cake was added water to prepare a slurry of 100 g/l in terms of $TiO_2$. Sodium hydroxide was added to the slurry to adjust the pH to 10.0. Then, the slurry was subjected to hydrothermal treatment at 150° C. for 3 hours in an autoclave. Nitric acid was added to the slurry after subjected to the hydrothermal treatment to neutralize the slurry to a pH of 7.0, followed by filtration, washing and drying to obtain titanium oxide (Sample 4). Sample 4 had a specific surface area of 60.0 $m^2/g$, had an anatase type crystal form and had an average particle size of 20.0 nm calculated with the Scherrer's formula.

EXAMPLE 12

One liter of an aqueous titanyl sulfate solution of 210 g/l in concentration which contained 54 g/l of iron sulfate in terms of Fe was heated to 85° C. and kept at that temperature for 3 hours to hydrolyze titanyl sulfate. Then, nitric acid was added to adjust the pH to 1.5 to peptize the solution. Then, to this peptized solution was added sodium hydroxide to adjust the pH to 7.0, followed by filtration, washing and drying to obtain a titanium oxide photocatalyst of the present invention which contained an iron compound (Sample O). This Sample O contained iron hydroxide in an amount of 0.025% by weight (in terms of Fe) based on the weight of $TiO_2$ of the titanium oxide and amount of iron hydroxide supported per square meter of the titanium oxide particles was 0.8 µg in terms of Fe. The Sample O had a specific surface area of 300 $m^2/g$, had an anatase type crystal form and had an average particle size of 6.0 nm calculated with the Scherrer's formula.

Comparative Example 4

The titanium oxide of Sample 4 obtained in Example 11 was used as Comparative Sample P. This Sample 4 contained the iron compound in an amount of 0.0001% by weight (in terms of Fe) based on the weight of $TiO_2$ of the titanium oxide.

The photocatalytic property of the samples (N, O, P) obtained in the above Examples and Comparative Examples was evaluated in the following manner. 0.02 g of the sample was charged in a container of 800 ml and then, acetaldehyde was charged therein, and the container was closed. The concentration of acetaldehyde in the container was about 100 ppm. Then, irradiation with black light was carried out for 1 hour to decompose acetaldehyde. The intensity of light was 1 $mW/cm^2$. The irradiated surface area was 15 $cm^2$. Change of the concentration of acetoaldehyde during the reaction was measured. From the measurements was calculated a first-order rate constant of decomposition (k). The results are shown in Table 2. As can be seen from this table, the titanium oxides containing iron compound of the present invention are superior in photocatalytic activity.

TABLE 2

| | Sample | First-order rate constant of decomposition k (hour$^{-1}$) |
|---|---|---|
| Example 11 | N | 4.25 |
| Example 12 | O | 15.16 |
| Comparative Example 4 | P | 1.07 |

EXAMPLE 13

One liter of an aqueous titanyl sulfate solution of 80 g/l in concentration was heated to 85° C. and kept at that temperature for 3 hours to hydrolyze titanyl sulfate. The thus obtained hydrolyzate was filtered and washed and then, suspended in water to obtain a suspension of 200 g/l in terms of $TiO_2$. Then, to the suspension was added under stirring an aqueous hydrofluoric acid solution so that the concentration of hydrofluoric acid was 0.15N. After kept at room temperature for 1 hour, the suspension was filtered, washed until the conductivity of the filtrate reached 200 μS/cm, and then dried to obtain a titanium oxide photocatalyst of the present invention (Sample Q). The Sample Q had a specific surface area of 310 m$^2$/g, had an anatase type crystal form and had an average particle size of 30 nm obtained by observation with an electron microscope.

EXAMPLE 14

The procedure of Example 13 was repeated, except that the concentration of hydrofluoric acid was 0.5N, thereby obtaining a titanium oxide photocatalyst of the present invention (Sample R). The Sample R had a specific surface area of 310 m$^2$/g, an anatase type crystal form and an average particle size of 30 nm obtained by observation with an electron microscope.

EXAMPLE 15

The procedure of Example 13 was repeated, except that the concentration of hydrofluoric acid was 1.5N, thereby obtaining a titanium oxide photocatalyst of the present invention (Sample S). The Sample S had a specific surface area of 310 m$^2$/g, an anatase type crystal form and an average particle size of 30 nm obtained by observation with an electron microscope.

EXAMPLE 16

10 g of titanium oxide which was the Sample R obtained in Example 14 and subjected to the mineral acid treatment was suspended in water to obtain a suspension of 100 g/l in terms of $TiO_2$. Then, to the suspension was added with stirring an acidic aqueous solution containing 14.5 mg of iron chloride ($FeCl_3 \cdot 6H_2O$), followed by adding aqueous ammonia to adjust the pH to 7.0. Then, the suspension was filtered, washed until the conductivity of the filtrate reached 20 μS/cm, then washed and dried to obtain a titanium oxide photocatalyst of the present invention which supported an iron compound (Sample T). This Sample T contained iron hydroxide in an amount of 0.03% by weight (in terms of Fe) based on the weight of $TiO_2$ of the titanium oxide and amount of the iron hydroxide supported per square meter of the surface area of the titanium oxide particles was 1.0 μg in terms of Fe.

Comparative Example 5

One liter of an aqueous titanyl sulfate solution of 80 g/l in concentration was heated to 850° C. and kept at that temperature for 3 hours to hydrolyze titanyl sulfate. The thus obtained hydrolyzate was filtered and washed to obtain a titanium oxide photocatalyst (Sample U). The Sample U had a specific surface area of 310 m$^2$/g, an anatase type crystal form and an average particle size of 30 nm obtained by observation with an electron microscope.

The photocatalytic property of the samples (Q–U) obtained in the above Examples and Comparative Examples was evaluated in the following manner. 0.1 g of each sample was dispersed in ion-exchange water to obtain a suspension of 4 g/l in terms of $TiO_2$. To 25 ml of the suspension was added 25 μl of 2-propanol, followed by irradiation with a black light (peak wavelength 365 nm) for 2 hours to carry out the photocatalytic reaction of 2-propanol. The intensity of light was 2 mW/cm$^2$. Change of the concentration of 2-propanol during the reaction was measured. From the measurements was calculated a first-order rate constant of decomposition (k). The results are shown in Table 3. As can be seen from Table 3, the titanium oxide photocatalysts of the present invention are superior in the photocatalytic property. It is not clear why the photocatalytic property is markedly improved when the titanium oxide is subjected to the mineral acid treatment, but it can be supposed that the mineral acid treatment causes increase in the amount of the material (to be decomposed) which is adsorbed to the titanium oxide and the adsorbed material to be decomposed rapidly reacts with the holes and electrons produced by photo-excitation of the titanium oxide.

TABLE 3

| | Sample | First-order rate constant of decomposition k (hour$^{-1}$) |
|---|---|---|
| Example 13 | Q | 0.47 |
| Example 14 | R | 0.71 |
| Example 15 | S | 0.58 |
| Example 16 | T | 0.77 |
| Comparative Example 5 | U | 0.27 |

EXAMPLE 17

The titanium oxide of Sample 1 obtained in Example 1 was suspended in water to obtain a suspension of 200 g/l in terms of $TiO_2$. Then, to the suspension was added under stirring an aqueous hydrofluoric acid solution so that the concentration of hydrofluoric acid was 0.15N. After kept at room temperature for 1 hour, the suspension was filtered, washed until the conductivity of the filtrate reached 200 μS/cm, and then dried to obtain a titanium oxide photocatalyst of the present invention (Sample V).

EXAMPLE 18

10 g of the titanium oxide which was the Sample V obtained in Example 17 and subjected to the mineral acid treatment was suspended in water to obtain a suspension of 100 g/l in terms of $TiO_2$. Then, to the suspension was added with stirring an acidic aqueous solution containing 8.70 mg of iron chloride (FeCl$_3$.6H$_2$O) dissolved therein, followed by adding aqueous ammonia to adjust the pH to 7.0. Then, the suspension was filtered, washed and dried to obtain a titanium oxide photocatalyst of the present invention which contained an iron compound (Sample W). This Sample W contained iron hydroxide in an amount of 0.018% by weight (in terms of Fe) based on the weight of TiO$_2$ of the titanium oxide and amount of the iron hydroxide supported per square meter of the surface area of the titanium oxide particles was 2.2 μg in terms of Fe.

The photocatalytic property of the samples (C, E, V, W) obtained in the above Examples and Comparative Examples was evaluated in the following manner. 0.1 g of each sample was dispersed in ion-exchange water to obtain a suspension of 4 g/l in terms of TiO$_2$. To 25 ml of the suspension was added 25 μl of 2-propanol, followed by irradiation with a black light for 2 hours to carry out the photocatalytic reaction of 2-propanol. The intensity of light was 2 mW/cm$^2$. The irradiated surface area was 28 cm$^2$. Change of the concentration of 2-propanol during the reaction was measured. From the measurements was calculated a first-order rate constant of composition (k). The results are shown in Table 4. As can be seen from Table 4, the titanium oxide photocatalysts of the present invention are superior in the photocatalytic activity. Especially, the titanium oxide photocatalysts which comprise titanium oxide particles which are subjected to the mineral acid treatment and on which the iron compound is supported have excellent photocatalytic activity which results from synergistic effect of the mineral acid treatment and the supporting of the iron compound.

TABLE 4

| Sample | | First-order rate constant of decomposition k (hour$^{-1}$) |
|---|---|---|
| Example 3 | C | 0.43 |
| Example 17 | V | 0.24 |
| Example 18 | W | 0.55 |
| Comparative Example 1 | E | 0.11 |

The titanium oxide photocatalyst of the present invention comprises titanium oxide particles which have an iron compound contained therein and/or an iron compound supported on the surface thereof. Thus, photocatalytic property of the titanium oxide can be improved. Furthermore, the titanium oxide photocatalyst of the present invention comprises titanium oxide which is treated with a mineral acid. Thus, photocatalytic property of the titanium oxide can be improved. Moreover, the titanium oxide photocatalyst of the present invention comprises titanium oxide particles which are treated with a mineral acid and which have an iron compound contained therein and/or an iron compound supported on the surface thereof. The photocatalytic property of the titanium oxide can be further improved. Utilizing the photocatalytic property, materials which exert or may exert a harmful influence upon human bodies and living environment can be rapidly and effectively removed. Therefore, the photocatalyst of the present invention is very useful not only for industrial use, but also as general household deodorants, fungicides, etc. Furthermore, the titanium oxide photocatalyst of the present invention can be employed for various uses because it is high in safety and moreover, does not pollute the environment even when it is thrown away.

What is claimed is:

1. A titanium oxide photocatalyst comprising titanium oxide particles which have part of an iron compound contained therein and the other part of the iron compound supported thereon.

2. A titanium oxide photocatalyst comprising titanium oxide particles treated with a mineral acid, wherein said titanium oxide particles have an average particle size of 1 to 1,000 nm.

3. A titanium oxide photocatalyst comprising titanium oxide particles which contain an iron compound.

4. A titanium oxide photocatalyst comprising titanium oxide particles which have an iron compound supported thereon.

5. A titanium oxide photocatalyst according to claim 1, 3, or 4, wherein said titanium oxide particles are of a mineral acid-treated titanium oxide.

6. A titanium oxide photocatalyst according to claim 5, wherein said mineral acid is hydrofluoric acid.

7. A titanium oxide photocatalyst according to claim 1, 3, or 4, wherein said iron compound is at least one compound selected from the group consisting of a ferrous compound and a ferric compound.

8. A titanium oxide photocatalyst according to claim 1, 3, or 4, wherein the average particle size of said titanium oxide particles is in the range of 1 to 500 nm.

9. A titanium oxide photocatalyst according to claim 1, 3, or 4, wherein said titanium oxide particles have said iron compound in an amount of 0.0005 to 10% by weight in terms of Fe based on the weight of TiO$_2$ of the titanium oxide particles.

10. A titanium oxide photocatalyst according to claim 1, 3, or 4, wherein said titanium oxide particles have said iron compound in an amount of 0.001 to 5% by weight in terms of Fe based on the weight of TiO$_2$ Of the titanium oxide particles.

11. A titanium oxide photocatalyst according to claim 1, 3, or 4, wherein said titanium oxide particles have said iron compound supported thereon in an amount of 0.05 to 5,000 μg in terms of Fe per square meter of the surface area of the titanium oxide particles.

12. A titanium oxide photocatalyst according to claim 1, 3, or 4, wherein said titanium oxide particles have said iron compound supported thereon in an amount of 0.1 to 3,000 μg in terms of Fe per square meter of the surface area of the titanium oxide particles.

13. A titanium oxide photocatalyst according to claim 1, 3, or 4, wherein the titanium oxide of said titanium oxide particles is an anatase type titanium oxide.

14. A method of producing the titanium photocatalyst according to claim 1, 3, or 4, which comprises the steps of hydrolyzing or neutralizing a titanium compound in the presence of an iron compound.

15. A method of producing the titanium photocatalyst according to claim 1, 3, or 4, which comprises the steps of hydrolyzing or neutralizing a titanium compound to obtain a titanium oxide, and immersing the titanium oxide in a solution of an iron compound.

16. A method according to claim 15, wherein said titanium compound is hydrolyzed at a temperature not higher than the boiling point of an aqueous solution of the titanium compound.

17. A method of producing the titanium photocatalyst according to claim 1, 3, or 4, which comprises the steps of hydrolyzing or neutralizing a titanium compound to obtain a titanium oxide and then treating the titanium oxide with a mineral acid.

18. A method according to claim 17, wherein said titanium compound is hydrolyzed at a temperature not higher than the boiling point of an aqueous solution of the titanium compound.

19. A method according to claim 14, wherein said titanium compound is hydrolyzed at a temperature not higher than the boiling point of an aqueous solution of the titanium compound.

20. A method of producing the titanium oxide photocatalyst according to claim 1, 3, or 4, which comprises the step of immersing a mineral acid-treated titanium oxide in a solution of an iron compound.

* * * * *